(12) United States Patent
Drayer

(10) Patent No.: US 7,650,717 B2
(45) Date of Patent: Jan. 26, 2010

(54) BELT DEVICE

(76) Inventor: Friedrich Drayer, Ahlenbachweg 19a, D-79286 Glottertal (DE)

( * ) Notice: Subject to any disclaimer, the term of this patent is extended or adjusted under 35 U.S.C. 154(b) by 177 days.

(21) Appl. No.: 11/224,862

(22) Filed: Sep. 13, 2005

(65) Prior Publication Data

US 2006/0100052 A1     May 11, 2006

(30) Foreign Application Priority Data

Sep. 14, 2004    (DE)   ........................ 10 2004 044 859

(51) Int. Cl.
    *A01G 9/12*          (2006.01)
    *A01G 17/12*      (2006.01)
    *A01G 17/08*      (2006.01)

(52) U.S. Cl. ............... 47/32.5; 47/32.6; 47/42

(58) Field of Classification Search .......... 47/32.4, 47/32.5, 42, 43; 119/798, 795, 797, 863; 280/743.2
See application file for complete search history.

(56) References Cited

U.S. PATENT DOCUMENTS

| | | | | |
|---|---|---|---|---|
| 3,444,957 A | * | 5/1969 | Gilpin, Jr. ................. | 182/3 |
| 3,804,698 A | * | 4/1974 | Kinloch .................... | 428/176 |
| 4,100,996 A | * | 7/1978 | Sharp ....................... | 182/3 |
| 4,253,544 A | * | 3/1981 | Dalmaso ................... | 182/3 |
| 4,446,944 A | * | 5/1984 | Forrest et al. ............ | 182/3 |
| 4,538,702 A | * | 9/1985 | Wolner .................... | 182/3 |
| 4,774,801 A | * | 10/1988 | Johansen et al. ......... | 54/34 |
| 5,050,906 A | * | 9/1991 | Kneip ...................... | 280/805 |
| 5,090,503 A | * | 2/1992 | Bell ......................... | 182/5 |
| 5,113,981 A | * | 5/1992 | Lantz ....................... | 188/371 |
| 5,174,410 A | * | 12/1992 | Casebolt .................. | 182/3 |
| 5,529,343 A | * | 6/1996 | Klink ....................... | 280/805 |
| 5,788,280 A | * | 8/1998 | Ohsumi .................... | 280/805 |
| 6,431,315 B1 | * | 8/2002 | Lewis ...................... | 182/92 |
| 2002/0148681 A1 | * | 10/2002 | Sharp ...................... | 182/3 |

OTHER PUBLICATIONS www.dictionary.com, definition of seam, Jan. 13, 2009.*
www.dictionary.com, definition of adhesive, Jan. 13, 2009.*

* cited by examiner

*Primary Examiner*—Son T. Nguyen
(74) *Attorney, Agent, or Firm*—Patent Central LLC; Stephen A. Pendorf

(57) ABSTRACT

A belt device for arrangements which are put under tensile load, particularly for systems for the securing of tree crowns, having a belt (10) with a loop at each end (12, 12') which is formed by turning over the end parts of the belt (10) and fastening the ends to the belt, wherein the fastenings (14, 14') and the belt (10) are adapted to withstand a pre-determined minimum tensile force. In order to guarantee a good visibility of the indicating element even from greater distances, it is proposed by the invention that the belt (10) is overlapped by an indicating element (16) in the vicinity of at least one of the loops (12), which indicating element shortens the belt (10) and is fastened with two end portions on the belt (10) such that one of the fastenings (18) gives way when a pre-determined tensile force acts on the belt (10), the tensile force being smaller than the minimum tensile force which the loop fastenings (14, 14') and the belt withstand.

18 Claims, 1 Drawing Sheet

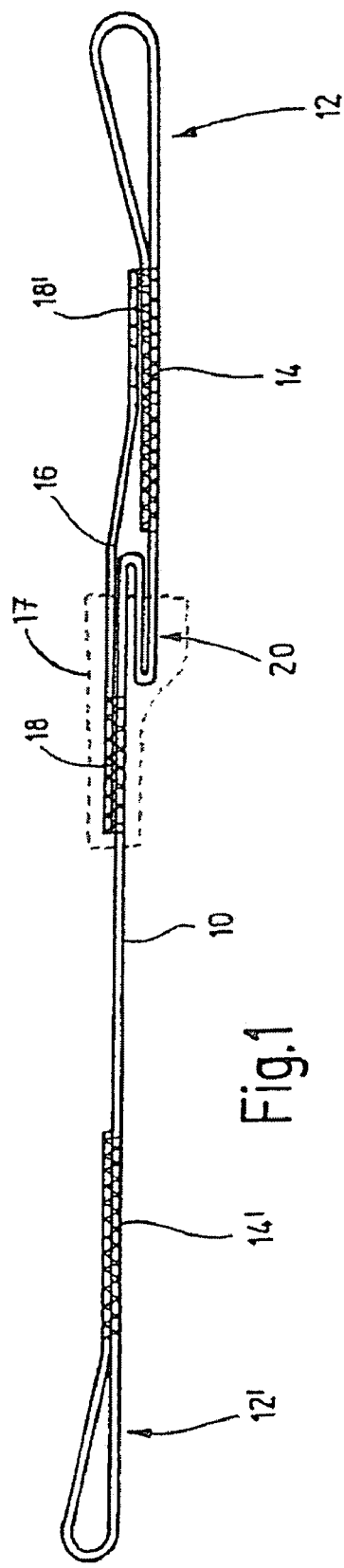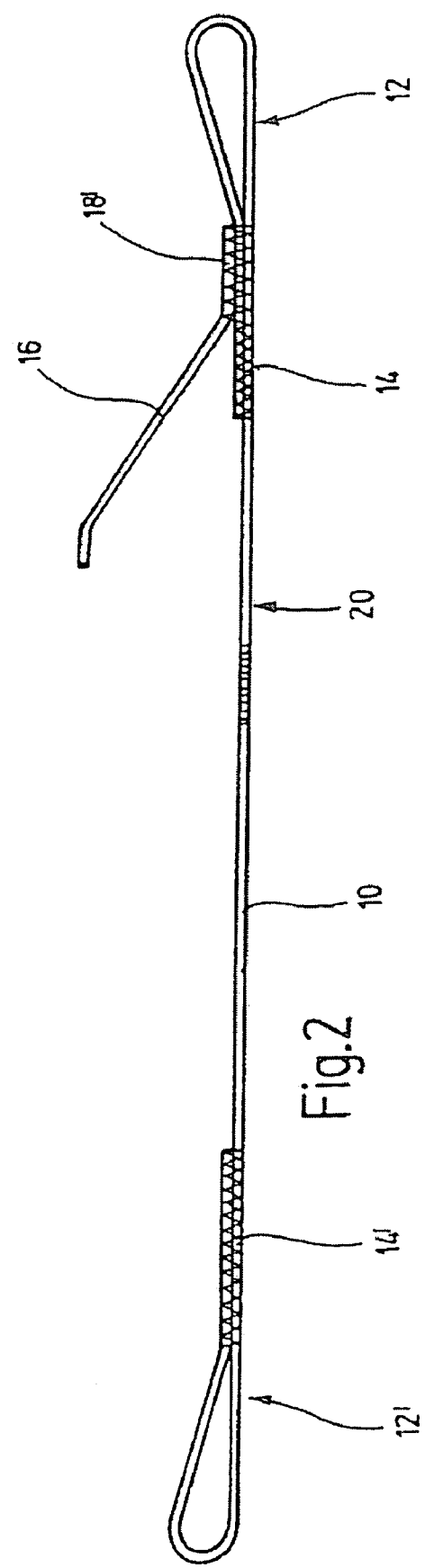

BELT DEVICE

BACKGROUND OF THE INVENTION

1. Field of the Invention

The invention relates especially to a belt or webbing device for arrangements which are under tensile strain, particularly for security systems of tree crowns, and, in general, to a tension device with overload indication.

2. Description of the Related Art

Crown security for trees should guard against breaking away or falling off of parts of the crown, thereby producing safety in the vicinity of the tree. Considering the general interest in preserving a continued existence of the available tree population, it has to be weighed in individual cases whether this safety can be achieved through removal of parts of the tree or adopting crown security measures; the latter is preferred. For security, amongst others, belt devices are used which, for example, comprise separate belts and safety loops. The loops are placed around those parts of the tree, which are to be secured and are joined with one another by ropes. Since this security measure can remain in place for several years, a regular checking of its condition is necessary. To ascertain whether any likely overload has taken place on the device, the device is commonly fitted with identification threads, which have a lower load limit than the rope material. A drawback here is that an inspection can take place only from the immediate vicinity, as torn identification threads cannot be deciphered with the required certainty from longer distances, like from the ground. This also entails a high amount of work effort.

SUMMARY OF THE INVENTION

Based on these considerations, the objective of the present invention is to provide for a device of the above type, which allows reliable assessment of occurrence of overshooting of a pre-determined tensile force from longer distances.

As per the invention, this objective is fulfilled through a device having the combination of features stated in the claims. The dependent claims indicate advantageous further developments and embodiments of the invention.

Based on the concept that an adequately clearly visible indicating element is required for a good visibility from longer distances, it is proposed in the invention that the belt is overlapped by an indicating element in the vicinity of at least one of the loops, which indicating element shortens the belt and is fastened with two end portions on the belt such that one of the fastenings gives way when a pre-determined tensile force acts on the belt, the tensile force being smaller than the minimum tensile force which the loop fastenings and the belt withstand. One of the fastenings of the indicating element thus works as a rated breaking point, where every desired release value can be attained by the design of the fastening, which is preferably achieved by means of a seam.

In a preferred embodiment of the invention, the belt is enclosed loosely between the loops by a preferably opaque protective tube which also covers particularly the indicating element in the condition where it is fastened at both ends. This protective tube serves as protection against chafing for the clasped part of the tree on one hand. On the other hand, it can be achieved that the indicating element is covered by the protective tube in its not-released condition, while in its released condition; it is clearly visible as it projects out of the corresponding end of the protective tube. To this end, it is of advantage when the fastening of the indicating element which is distant from the loop gives way when the pre-determined tensile force is exceeded.

The portion of the belt which is overlapped by the indicating element is preferably folded in a Z-shaped manner so that the effective length of the belt is increased when the indicating element is released, and the indicating element juts out of the protective tube at least partly after one of its fastenings has given way due to the tensile force exceeding the predetermined limit.

In a preferred embodiment of the invention, the belt and/or the indicating element is made of a plastic material, preferably of a polyester, polyamide or polyethylene fabric. These materials have proven themselves to possess adequate tensile strength and elasticity.

A clear visibility, even from greater distances, is possible only when the belt and the indicating element have different colours, wherein the indicating element advantageously has a signalling colour, especially yellow, orange or red.

The fastening of the end part of the belt which forms the loop is preferably effected by a seam. It can, however, also be effected through plastic welding, an adhesive, or through riveting. The same holds for the fastening of the end parts of the indicating element on the belt.

In practice, the tensile force which leads to a yielding of the fastening of the end areas of the indicating element on the belt has values lying between 5 kN and 100 kN.

The fundamental concept of the invention is also applicable in case of a tension device with overload indication having a tension organ which is designed to be a chain, rope, or belt, at the ends of which a tensile force acts, and which has at least one indicating element which visually signals a tensile force which exceeds a pre-determined tensile force. A tension device of such a type can be used, for example, in case of rigging systems (lifting and lowering systems for loads) or in towing systems. As per the invention, the tension organ is enclosed by an opaque tube body 17, covering at least the indicating element. The indicating element is fastened with two end parts on the tension organ, and it overlaps the tension organ forming a loop portion in the length direction, which shortens the tension organ. If the tensile force exceeds a predetermined limit, preferably one of the fastenings of the indicating element on the tension organ gives way, and at least one portion of the indicating element is pulled out from the covering through the tube body by the loop part of the tension organ.

BRIEF DESCRIPTION OF THE DRAWINGS

The invention is explained in greater detail below with reference to an embodiment, as illustrated in the drawing. It is shown in:

FIG. 1 a schematic cross sectional view of a belt device with an indicating element which is fastened at both ends.

FIG. 2 the belt device of FIG. 1 after one fastening of the indicating element has given way when a pre-determined tensile loading has been exceeded.

DETAILED DESCRIPTION OF THE INVENTION

The belt device, as shown in the drawing, essentially comprises a belt 10, whose ends are turned over to form loops 12, 12', wherein the end parts of the belt are fastened by seams 14, 14' on those parts of the belt which are at a distance from the ends. The length of the seam area, the stitching material, as well as the stitching pattern, influence the load bearing capacity of the fastenings. The belt device is intended to be placed around the tree part that is to be secured or supported. Loops 12, 12' serve to attach a rope or a similar object, which joins together two of the shown belt devices and thus forms a load carrying system in which a weak or damaged tree part is supported by a healthy or stronger part of the tree.

An indicating element 16 is arranged in the region of the loop 12; this indicating element may also be a piece of belt and is fastened to the belt 10 with its ends. The fastening takes place through seams 18, 18', wherein the load carrying capacity of the seams 18, 18' is different. The seam 18 is a rated breaking point which yields to a pre-determined load, while the seam 18' withstands higher loads. As FIG. 1 shows, the portion 20 of the belt 10 which is overlapped by the indicating element 16 is folded in a Z-shaped manner, whereby the free length of the device is shortened in this state. The length of the belt of the portion 20 approximately corresponds to the length of the indicating element 16.

In the region between the loops 12, 12', the device is enclosed by a protective tube (not shown in detail) which acts as a protection against chafing for the clasped part of the tree, and in the state shown in FIG. 1, covers at least most of the indicating element 16.

FIG. 2 illustrates the state of the device after the pre-determined load bearing capacity of the fastening 18 has been exceeded. It has released itself, and portion 20 of the belt 10 has extended itself by action of the tensile force which is acting on the loops 12, 12', with the result that the free length of the device has been increased. At least a substantial portion of the indicating element has thus come out of the protective tube and has become visible. Since the indicating element 16 has a different color than the belt 10, especially a signalling colour such as red, yellow or orange, the indicating element 16 is now visible from a greater distance, at least from the ground at the tree location.

In principle, the illustrated device is also suitable as an overload indicator for applications other than securing a tree crown, as, for example, when loads are to be lifted or pulled. The tensile force then acts in the direction of the linear extended device.

In summary, the following can be stated: The invention relates to a belt device for arrangements which are put under tensile load, particularly for systems for the securing of tree crowns, having a belt 10 with a loop at each end 12, 12' which is formed by turning over the end parts of the belt 10 and fastening the ends to the belt, wherein the fastenings 14, 14' and the belt 10 are adapted to withstand a pre-determined minimum tensile force. In order to guarantee a good visibility of the indicating element even from greater distances, it is proposed by the invention that the belt 10 is overlapped by an indicating element 16 in the vicinity of at least one of the loops 12, which indicating element shortens the belt 10 and is fastened with two end portions on the belt 10 such that one of the fastenings 18 gives way when a pre-determined tensile force acts on the belt 10, the tensile force being smaller than the minimum tensile force which the loop fastenings 14, 14' and the belt withstand.

The invention claimed is:

1. A tree tensile load indicating belt device, having
    a belt (10) with a loop at each end (12, 12') which loop is formed by turning over the end parts of the belt (10) and fastening the ends to the belt via fastenings (14, 14'), wherein the fastenings (14, 14') and the belt (10) are adapted to withstand a predetermined minimum tensile force, said belt being a first color, and
    an indicating element (16) having a signalling colour different from said first color in the vicinity of at least one of the loops (12), which indicating element is fastened with fastenings (18, 18') at first and second end portions of the signalling element onto the belt (10) such that said indicating element (16) shortens the belt (10), wherein the load carrying capacity of the fastenings (18, 18') is different, wherein the first indicating element end fastening (18) is a rated breaking point which yields to a pre-determined load, while the second indicating element end fastening (18') withstands higher loads such that the first indicating element end fastening (18) gives way when a pre-determined tensile force acts on the belt (10), the tensile force being smaller than said minimum tensile force which the loop fastenings (14, 14') and the belt are adapted to withstand, whereby the indicating element (16), released at one end and attached at the other end, forms a signal pendant different in color from said first color, wherein one end of said belt device is secured to a tree part to be monitored, and the other end of said belt device is secured to a tree part stronger than the tree part to be monitored.

2. The belt device according to claim 1, wherein the belt (10) is enclosed loosely between the loops (12, 12') by an opaque protective tube (17), which also covers the indicating element (16) in the state in which both its ends are fastened.

3. The belt device according to claim 2, wherein the indicating element (16) projects beyond the opaque protective tube (17) at least partially after its fastening (18) has given way when the tensile force has exceeded the limit.

4. The belt device according to claim 1, wherein the fastening (18) which is distant to the loop gives way when the pre-determined tensile force is exceeded.

5. The belt device according to claim 1, wherein a region (20) of the belt (10) which is overlapped by the indicating element (16) is folded in a Z-shaped manner.

6. The belt device according to claim 1, wherein the belt (10) is made of a plastic material.

7. The belt device according to claim 6, wherein the plastic material is a polyester-, polyamide- or polyethylene fabric.

8. The belt device according to claim 1, wherein the indicating element (16) is made of a plastic material.

9. The belt device according to claim 8, wherein the plastic material is a polyester-, polyamide- or polyethylene fabric.

10. The belt device according to claim 1, wherein the indicating element (16) is yellow, orange or red.

11. The belt device according to claim 1, wherein the fastening (14, 14') of the end portions of the belt (10) which forms the loop (12, 12') is a seam.

12. The belt device according to claim 1, wherein the fastening of the end portions of the belt (10) which forms the loop (12, 12') is by plastic welding, by means of an adhesive or by riveting.

13. The belt device according to claim 1, wherein the fastening (18, 18') of the end portions of the indicating element (16) on the belt (10) is by a seam.

14. The belt device according to claim 1, wherein the fastening of the end portions of the indicating element (16) on the belt (10) is by plastic welding, by means of an adhesive or by riveting.

15. The belt device according to claim 1, wherein the tensile force leading to giving way of the fastening (18) of the end portion of the indicating element (16) on the belt (10) is in the range of 5 kN to 100 kN.

16. A tree tension device with overload indication, including
    a chain, rope or belt tension organ (10), at the ends of which a tensile force acts, and
    at least one indicating element (16) having a signalling colour different from the tension organ (10) color which indicating element (16) when released visually signals a tensile force which exceeds a pre-determined tensile force,
wherein the tension organ (10) is enclosed by an opaque protective tube (17) which covers at least the indicating element (16), and
wherein the indicating element (16) is fastened with two end portions on the tension organ (10) and overlaps the tension organ in the length direction, forming a loop part (20) which shortens the tension organ, the indicating element (16) having a signalling colour, which indicating element is fastened with fastenings (18, 18') at first and second end portions of the signalling element onto the tension organ (10) such that said indicating element (16) shortens the tension organ (10), wherein the load carrying capacity of the fastenings (18, 18') is different, wherein the first indicating element end fastening (18) is a rated breaking point which yields to a pre-determined load, while the second indicating element end fastening (18') withstands higher loads such that the first indicating element end fastening (18) gives way when a pre-determined tensile force acts on the tension organ (10), the tensile force being smaller than said minimum tensile force which the loop fastenings (14, 14') and the belt are adapted to withstand, whereby the indicating element (16), released at one end and attached at the other end, forms a signal pendant wherein one end of said tension device is secured to a tree part to be monitored, and the other end of said tension device is secured to a tree part stronger than the tree part to be monitored.

17. The tension device according to claim 16, wherein the first fastening (18) of the indicating element (16) on the tension organ (10) gives way when a predetermined tensile force is exceeded and at least a portion of the indicating element (16) is pulled out from the opaque protective tube (17) by the straightening of the loop part (20) of the tension organ (10).

18. A tree tensile load indicating method for quickly and reliably determining from a distance whether an overload has occurred on a belt device, the method comprising:

forming a belt (10) with a loop at each end (12, 12') which loop is formed by turning over the end parts of the belt (10) and fastening the ends to the belt via fastenings (14, 14'), wherein the fastenings (14, 14') and the belt (10) are adapted to withstand a predetermined minimum tensile force, said belt being a first color, providing said belt with an indicating element (16) having a signalling colour different from said first color in the vicinity of at least one of the loops (12), which indicating element is fastened with fastenings (18, 18') at first and second end portions of the signalling element onto the belt (10) such that said indicating element (16) shortens the belt (10), wherein the load carrying capacity of the fastenings (18, 18') is different, wherein the first indicating element end fastening (18) is a rated breaking point which yields to a pre-determined load, while the second indicating element end fastening (18') withstands higher loads such that the first indicating element end fastening (18) gives way when a pre-determined tensile force acts on the belt (10), the tensile force being smaller than said minimum tensile force which the loop fastenings (14, 14') and the belt are adapted to withstand, attaching said first loop to a tree part to be monitored, attaching said second loop to a tree part stronger than the tree part to be monitored, observing whether a signal pendant different in color from said first color has been released by the indicating element (16) becoming released at one end while remaining attached at the other end, the signal pendant indicating that overload has occurred on a belt device.

\* \* \* \* \*